S. B. H. VANCE.
Electric Gas-Lighter.
No. 318. A. I. Patented March 12, 1861.
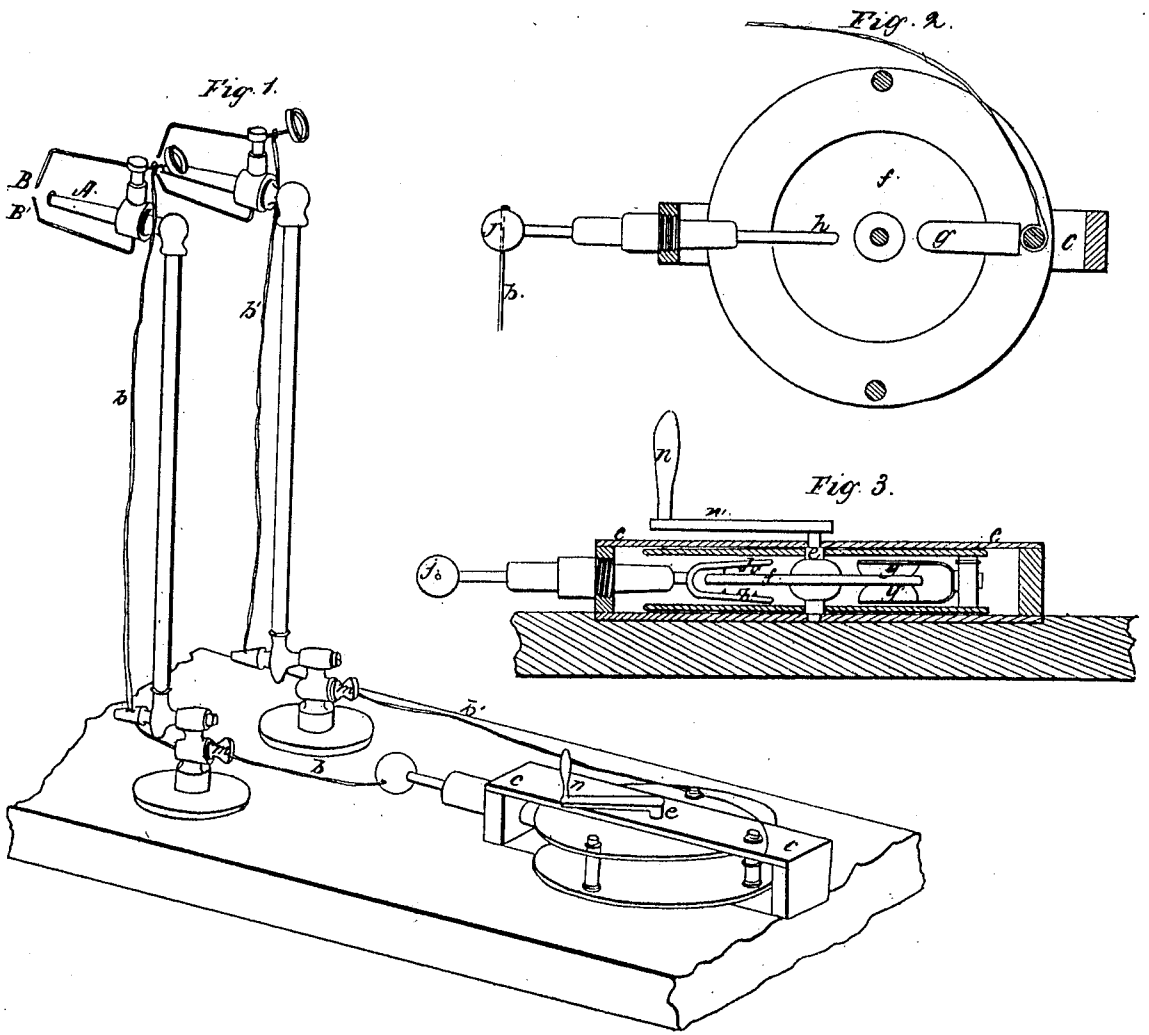
Witnesses:
E. Cohen
J. Hirsh
Inventor:
Samuel B. H. Vance
By atty A. B. Stoughton
N. PETERS, Photo-Lithographer, Washington, D. C.

UNITED STATES PATENT OFFICE.

SAMUEL B. H. VANCE, OF NEW YORK, N. Y.

IMPROVED ELECTRICAL APPARATUS FOR LIGHTING GAS.

Specification forming part of Letters Patent No. 318, dated March 12, 1861.

*To all whom it may concern:*

Be it known that I, SAMUEL B. H. VANCE, of the city and county of New York, and State of New York, have invented certain new and useful improvements in addition to those patented to me for an Improved Electrical Apparatus for Lighting Gas; and I do hereby declare that the following is a full, clear, and exact description of the same, reference being had to the accompanying drawings, making a part of this specification, in which—

Figure 1 represents a perspective view of the entire apparatus. Fig. 2 represents a horizontal section through the electrical apparatus, and Fig. 3 represents a vertical longitudinal section thereof.

Similar letters of reference, where they occur in the separate figures, denote like parts in all the drawings.

Letters Patent of the United States were granted to Mitchell, Vance & Co., assignees of Samuel B. H. Vance, for an improved electrical apparatus for lighting gas. In that patent the invention is limited to a portable electric machine.

The additional improvement which I have made, and which I desire to have added to my former invention, consists in making the apparatus stationary or non-portable, the other characteristics of the invention remaining the same in all its essential parts.

To enable others skilled in the art to make and use this additional improvement, I will proceed to describe the same by reference to the drawings.

The oblong case *c*, instead of being united to a handle, is united to a base, board, or frame of any kind, by which it may be affixed to the wall in any convenient position. The case, being of hard rubber, is its own insulator.

*e* is the shaft to which the glass plate *f* is attached, and *n* the crank by which it is turned. *g* are the pads in contact with the glass plate, for producing frictional electricity, and *h* the forks or points for collecting, and *j* the ball for retaining, the electricity. From this ball *j* a wire, *b*, extends to the burner A, its point B terminating at or near where the gas is to be lighted; and opposite to the point B there is another point, B′, so that the spark that is to light the gas shall, in passing from point to point, pass through the jet of gas, and thus insure its ignition.

From the negative end of the electrical machine a spark may be conducted to a second burner by a wire, *b′*, so that two burners may be lighted when the ball *j* was not really charged with sufficient electricity to light two burners of itself.

To use this apparatus it is only necessary to turn the gas-cocks *m m* open and give the glass plate *f* a few turns by the crank *n*, and the gas will be ignited by the sparks passing from the points B through the jets of gas. Of course, any sized electrical apparatus may thus be used and any number of wires within its capacity extend from it to the burners to be lighted by it, the only difference between this apparatus and that patented on the 5th of February, 1861, being that the one patented was portable and this is not portable, but designed as a fixture to the wall or elsewhere.

What I claim as an additional improvement, and desire to have added to the patent aforesaid, is—

The employment or use of the stationary electric machine, as described, in place of the lamp, candle, taper, or other match generally used for lighting gas.

SAML. B. H. VANCE.

Witnesses:

C. TIERS MYERS,

J. OSTERWALD.